United States Patent [19]
Ring et al.

[11] Patent Number: 5,713,261
[45] Date of Patent: Feb. 3, 1998

[54] SLACK ADJUSTABLE FORCE TRANSMITTING CYLINDER

[75] Inventors: Michael E. Ring, Crown Point, Ind.; Scott L. Natschke, Kankakee, Ill.; Michael G. Hawryszkow, Munster, Ind.

[73] Assignee: Westinghouse Air Brake Company, Wilmerding, Pa.

[21] Appl. No.: 664,389

[22] Filed: Jun. 14, 1996

[51] Int. Cl.⁶ ..................................................... F01B 31/00
[52] U.S. Cl. .................... 92/130 R; 92/13.8; 188/196 D; 188/202; 188/153 R
[58] Field of Search ................ 188/170, 196 D, 188/202, 203, 199, 153 R; 92/20, 29, 130 A, 129, 130 R, 13.8

[56] References Cited

U.S. PATENT DOCUMENTS

| | | | |
|---|---|---|---|
| 3,602,343 | 8/1971 | Billeter | 188/202 |
| 4,431,089 | 2/1984 | Nadas et al. | 188/196 D |
| 4,493,246 | 1/1985 | Dalibout | 92/13.8 |
| 4,544,047 | 10/1985 | Clemmons et al. | |
| 4,585,097 | 4/1986 | Severinsson | 188/202 |
| 4,662,485 | 5/1987 | Kanjo et al. | 188/196 D |
| 4,785,717 | 11/1988 | Rocholl | 92/130 R |

*Primary Examiner*—Thomas E. Denion
*Attorney, Agent, or Firm*—James Ray & Associates

[57] ABSTRACT

A pressure actuated force transmitting cylinder includes a housing member having first and second elongated portions. An end cap closes one end of the housing in a fluid tight manner. A connection is formed through such first portion for communicating fluid to such cylinder. A clutch having a first clutch surface is disposed on such housing and a piston-like member is disposed for reciprocal movement in such housing. A seal disposed around a peripheral portion of such piston-like member provides a chamber to receive such fluid. An elongated rod-like member, having a threaded portion, is connected to such piston-like member. A threaded nut member is threadedly engaged with such threaded portion. A trigger mechanism is disposed around a portion of such rod-like member adjacent such nut member. A disc-like member is disposed around such trigger. A first race assembly is abuttingly engaged with a flat surface formed on such nut member and a second race assembly is abuttingly engaged with another flat surface formed on such nut member. Such first and second race assemblies permit rotation of such nut member on such threaded portion. Finally a first urging mechanism, in combination with fluid communicated to such cylinder, urges such second clutch surface away from such first clutch surface and a second urging mechanism overcomes such first mechanism and urges such second clutch surface into engagement with such first clutch surface when pressure is absent in such cylinder.

20 Claims, 1 Drawing Sheet

5,713,261

SLACK ADJUSTABLE FORCE TRANSMITTING CYLINDER

CROSS REFERENCE TO RELATED APPLICATIONS

The invention taught in the present application is closely related to each of the following co-pending and concurrently filed patent applications titled, "RAILWAY VEHICLE BRAKE SYSTEM" and "PNEUMATIC PRESSURE OPERATED PARKING BRAKE FOR A RAILWAY VEHICLE BRAKE SYSTEM". These co-pending and concurrently filed applications are, also, assigned to the assignee of the present invention. In addition, the teachings provided in each of these co-pending and concurrently filed applications are incorporated herein by reference thereto.

FIELD OF THE INVENTION

The present invention relates, in general, to fluid pressure actuated type cylinders and, more particularly, this invention relates to a fluid pressure actuated force transmitting cylinder which is capable of being locked in position even in the event of fluid pressure being bled off and which is, also, capable of adjusting for any slack that may be present in a system having such force transmitting cylinder incorporated therein and, still more particularly, this invention relates to such a fluid pressure actuated force transmitting cylinder that can be effectively incorporated into a railway freight car type parking brake system or to even replace certain types of brake cylinders presently being used in various railway vehicle type braking applications.

BACKGROUND OF THE INVENTION

There are numerous uses for fluid pressure actuated type cylinders, as is generally well known in the art. These prior art type cylinders may be actuated by either hydraulic pressure or pneumatic pressure. Cylinders of these type have been and are still being used extensively in heavy construction type equipment and in various railroad type applications.

Prior to the conception and subsequent development of the invention to be taught hereinafter, as is generally quite well known in the railroad industry, railway type freight cars are required to be equipped with a parking brake as a part of the necessary braking system disposed on such freight cars.

These prior art type parking brakes have to be set manually. As a result, these parking brakes are commonly known in the industry as hand brakes. Such parking brakes are set, at least, when the brake pipe air line disposed on such freight cars is not connected for fluid communication with the brake pipe air line which is a part of the air brake system disposed on a train consist. This would necessarily be the case, for example, when such freight car is either waiting to be connected into such a train consist or when such freight car has been removed from such a train consist.

The parking brakes being used in this application, for many years prior to the present invention, have all required that they be both manually applied and thereafter released by railroad personnel. Such manual application and subsequent release of these hand brakes has required these prior art type parking brakes to be equipped either with a rotatable hand wheel member or with a pump action type hand crank member.

Normally, either through the rotation of such hand wheel member, or by pumping on the hand crank member, the required amount of brake force can be generated and applied to the brake beam and/or beams. Such brake beam caries the brake shoes thereon which are brought into frictionally engagement with at least a portion of the tread surface of the respective wheels disposed on the truck member portion of a freight car during a brake application.

Such required braking force is applied to these brake beams, and then to the brake shoes, through a chain that is connected at a first end thereof to a chain drum disposed in the hand brake secured to the freight car and then connected at a second end thereof to the brake beams, carrying such brake shoes, through a brake lever system. Such chain drum being rotated thorough the manual operation of the hand wheel member or hand crank. These prior art type parking brake systems are quite well known in the railway braking art and, therefore, a further more detailed description of them here in order to fully appreciate the advantages gained by the present invention is believed to be unnecessary.

It is further well known in the railway industry that these parking brakes are a highly critical component with respect to the safe operation of a freight car. Therefore, it is critical that they be maintained in very good working condition at all times.

Recently, the Association of American Railroads (AAR) made a specific request, to all of the manufacturers of such railway freight car parking brake systems, to submit to them any new proposals they might generate for improving such parking brake systems. Such request by the AAR was instrumental in leading to the development of the force transmitting cylinder of the present invention.

SUMMARY OF THE INVENTION

The present invention provides a fluid pressure actuated force transmitting cylinder. Such force transmitting cylinder includes an elongated housing member having a first and a second elongated portion. A first end cap means engages such first elongated portion adjacent a first end thereof for closing such first end of such elongated housing member in a substantially fluid tight manner. Such elongated housing member further includes a fluid connection means formed through such first elongated portion adjacent such first end cap means for enabling communication of a predetermined fluid to such fluid pressure actuated force transmitting cylinder. Further, such elongated housing member includes a second end cap means that engages such second elongated portion adjacent a first end thereof for partially closing an axially opposed second end of such elongated housing member. An aperture is formed substantially through a center portion of such second end cap means. The elongated housing member further includes a securing means engageable with an axially opposed second end of such first elongated portion and an axially opposed second end of such second elongated portion for securing such first elongated portion to such second elongated portion and thereby form such elongated housing member. Such force transmitting cylinder also includes a clutch means disposed within such elongated housing member intermediate such first end of such first elongated portion and such second end of such second elongated portion for providing a first clutch surface. A piston-like member is disposed for reciprocal movement within such elongated housing member adjacent such first end of such first elongated portion. Such force transmitting cylinder is further provided with a sealing means disposed around a peripheral portion of such piston-like member for providing a fluid tight chamber defined by an inner surface of such first end cap means, a first surface of such piston-like member disposed facing the inner surface of such first end cap means and a portion of an inner surface of such first elongated portion of such elongated housing member. Such fluid tight chamber receives such predetermined fluid being communicated to such force transmitting cylinder therein and causes linear displacement of such piston-like member. There is an elongated rod-like member connected at a first end thereof to a radially opposed second surface of such piston-like member and extends through such aperture formed substantially through a center of such second end cap means for a first predetermined distance adjacent an axially opposed second end thereof. Such elongated rod-like member has a threaded portion that extends for a second predetermined distance from a predetermined starting point adjacent such first end thereof. Such force transmitting cylinder further includes a threaded nut member threadedly engaged with such threaded portion of such elongated rod-like member along with a second clutch surface disposed on such threaded nut member in a position which enables frictional engagement with such first clutch surface disposed on such clutch means. An elongated trigger mechanism is disposed around a portion of such elongated rod-like member. A first end of such elongated trigger mechanism being disposed adjacent such threaded nut member and a second end of such elongated trigger mechanism extending out of such aperture formed substantially through a center of such second end cap means for a third predetermined distance. Additionally, such force transmitting cylinder includes a disc-like member disposed around and secured to an outer surface of such trigger mechanism a fourth predetermined distance from such first end thereof. There is also provided, in such force transmitting cylinder, a first race assembly having a first surface thereof abuttingly engaged with a first substantially flat surface formed on such threaded nut member and a second race assembly having a first surface thereof abuttingly engaged with a second substantially flat surface formed on such threaded nut member and a second radially opposed surface abuttingly engaged with a first substantially flat surface on such disc-like member. Such first race assembly and such second race assembly permit free rotation of such threaded nut member on such threaded portion of such rod-like member as necessary to extend such rod-like member from such second end cap means when such first clutch surface disposed on such clutch means is disengaged from such second clutch surface that is disposed on such threaded nut member. In addition, such force transmitting cylinder is provided with a first urging means caged between a second radially opposed surface of such first race assembly and a second radially opposed surface of such piston-like member for urging, in combination with such fluid pressure being communicated to such force transmitting cylinder, such second clutch surface carried by such threaded nut member away from such first clutch surface carried by such clutch means. The final essential component of this force transmitting cylinder is a second urging means, caged between a second radially opposed surface of such second race assembly and an inner surface of such second end cap means, for overcoming such first urging means and for urging such second clutch surface carried by such threaded nut member into engagement with such first clutch surface carried by such clutch means when such fluid pressure is absent in such force transmitting cylinder.

OBJECTS OF THE INVENTION

It is, therefore, one of the primary objects of the present invention to provide a fluid pressure actuated force transmitting cylinder which includes a locking mechanism incorporated therein that imparts the capability of maintaining such force even in the event of the fluid pressure being bled off while such force transmitting cylinder is exerting a required force.

Another object of the present invention is to provide a fluid pressure actuated force transmitting cylinder which can adjust for any slack that may be present in the particular system utilizing such force transmitting cylinder.

Still another object of the present invention is to provide a fluid pressure actuated force transmitting cylinder which can be used effectively in a railway freight car type parking brake system.

Yet another object of the present invention is to provide a fluid pressure actuated force transmitting cylinder which can be used effectively to replace certain type brake cylinders that are presently being used in a number of railway vehicle type brake systems.

A further object of the present invention is to provide a fluid pressure actuated force transmitting cylinder which is relatively inexpensive to produce.

It is still an additional object of the present invention to provide a fluid pressure actuated force transmitting cylinder which is relatively light weight.

Another object of the present invention is to provide a fluid pressure actuated force transmitting cylinder which can be effectively retrofitted for use in a number of presently known cylinder applications.

Still yet another object of the present invention is to provide a fluid pressure actuated force transmitting cylinder which is relatively simple to operate.

Yet still another object of the present invention is to provide a fluid pressure actuated force transmitting cylinder which will exhibit a relatively long and useful service life in its intended application.

It is a still further object of the present invention to provide a fluid pressure actuated force transmitting cylinder which is ruggedly constructed for use in rather severe and critical type applications.

A further object of the present invention is to provide a fluid pressure actuated force transmitting cylinder which will require a minimal amount of maintenance during the useful life of such cylinder.

In addition to the several objects and advantages of the present invention that have been discussed in some detail above, various additional objects and advantages of the slack adjustable force transmitting cylinder, according to the present invention, will become more readily apparent to those persons who are skilled in the fluid pressure actuated cylinder art from the following more detailed description of the invention, particularly, when such detailed description is taken in conjunction with the attached drawing Figures and with the appended claims.

Figure 1:
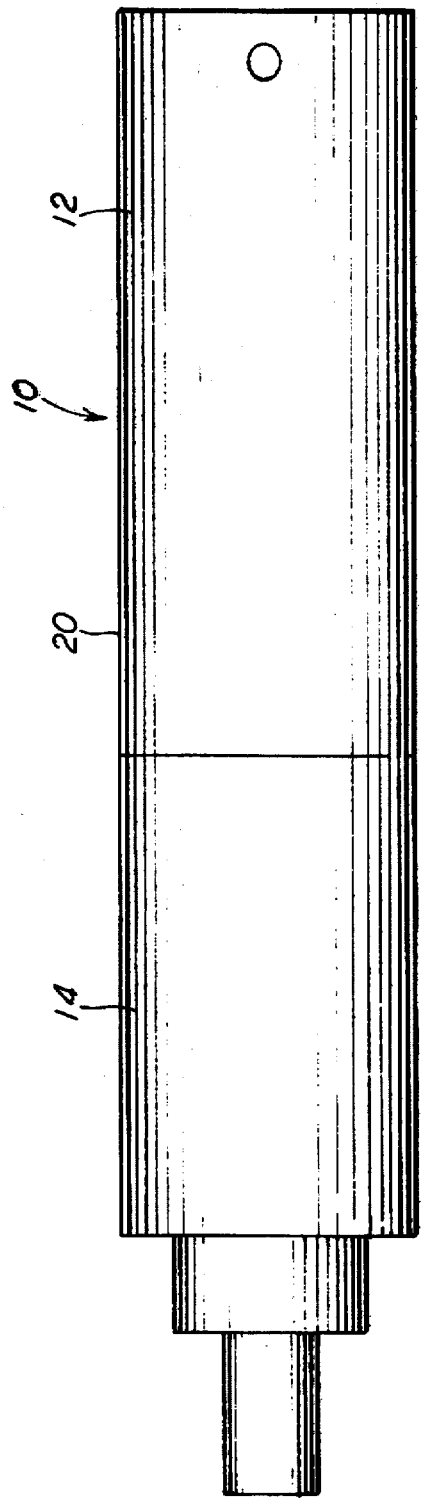
FIG. 1 is a side elevation view of a presently preferred embodiment of a fluid pressure actuated force transmitting cylinder means produced in accordance with the present invention.

BRIEF DESCRIPTION OF THE PRESENTLY PREFERRED AND VARIOUS ALTERNATIVE EMBODIMENTS OF THE INVENTION

Prior to proceeding to the more detailed description of such fluid pressure actuated force transmitting cylinder, it should be noted that, for the sake of clarity and understanding of the invention, identical components having identical functions have been identified with identical reference numerals throughout the views illustrated in the attached drawing.

Figure 2:
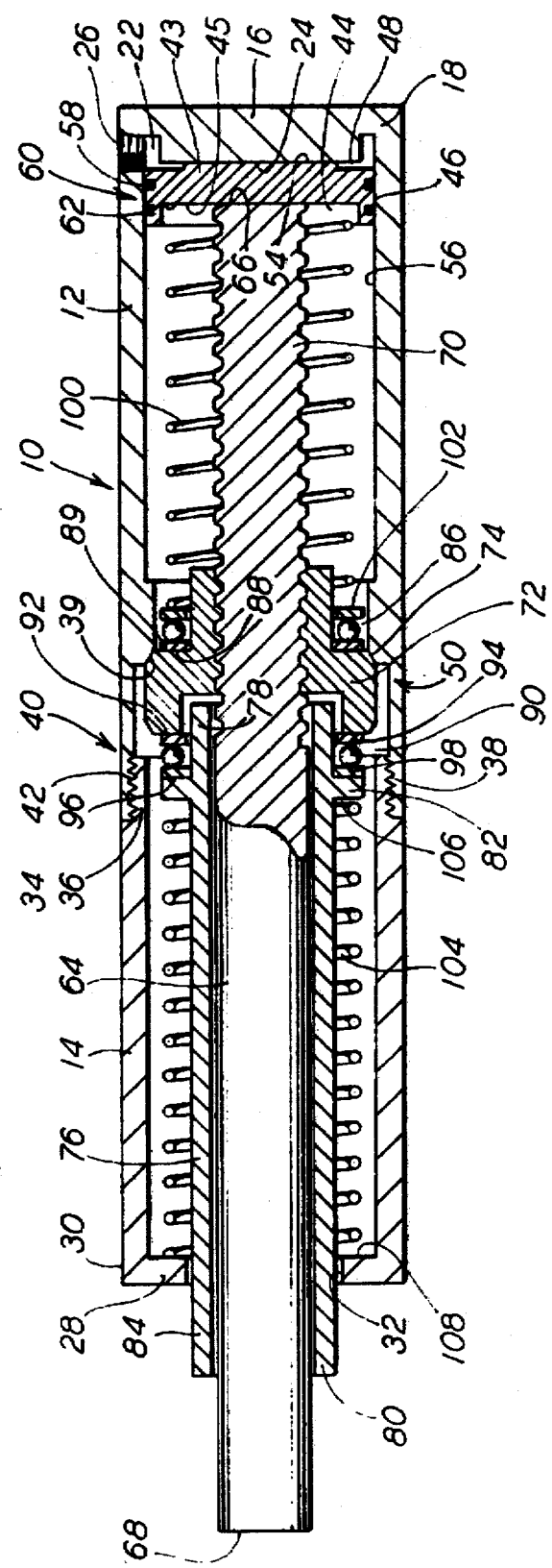
FIG. 2 is a cross-sectional view, taken along the lines II—II of FIG. 1, of such fluid pressure actuated force transmitting cylinder means.

Now reference is made, more particularly, to both FIGS. 1 and 2. Illustrated therein is a presently preferred embodiment of the fluid pressure actuated force transmitting cylinder, generally designated 10.

The fluid pressure actuated force transmitting cylinder 10, according to the present invention, can be actuated into a force transmitting position by either pneumatic pressure or hydraulic pressure. It is presently preferred, however, that such fluid pressure to actuate such fluid pressure actuated force transmitting cylinder 10 is hydraulic pressure.

Such force transmitting cylinder 10 includes an elongated housing member, generally designated 20. According to the presently preferred embodiment of the invention, such elongated housing member 20 includes a first elongated portion 12, which will have a first predetermined length, and a second elongated portion 14 which will have a second predetermined length. As best seen in FIG. 1, the first predetermined length of such first elongated portion 12 of the elongated housing member 20 is greater than the second predetermined length of such second elongated portion 14.

In addition, in this presently preferred embodiment of the invention, such first elongated portion 12 and such second elongated portion 14 of the elongated housing member 20 will be produced as generally cylindrical tube-like members. For ease of production, such tube-like members may be a length of pipe, for example.

There is a first end cap means 16 engaged with such first elongated portion 14 of such elongated housing member 20 adjacent a first end 18 thereof. This first end cap means 16 closes such first end 18 of the elongated housing member 20 substantially in a fluid tight manner.

In the presently preferred embodiment of the fluid pressure actuated force transmitting cylinder 10, according to the invention, such first end cap means 16 will be removably secured to the first end 18 of such first elongated portion 12 of the elongated housing member 20. This is preferably accomplished by having such first end cap means 16 threadedly engaged with such first end 18 of such first elongated portion 12 of the elongated housing member 20.

As can best be seen in FIG. 1, of the drawing, such first end cap means 16 includes an annular groove 22 formed therein adjacent the inner surface 24 thereof. Such annular groove 22 receives the fluid pressure therein. Annular groove 22 exhibiting each of a predetermined width and a predetermined depth and a generally rectangular shape in cross section. In place of such annular groove 22, such first end cap means 16 may optionally include a recess portion (not shown) formed in such inner surface 24 thereof.

There is a fluid connection means 26 formed through such first elongated portion 12 of the elongated housing member 20 adjacent such first end cap means 16. This fluid connection means 26 will enable the communication of such predetermined fluid, preferably hydraulic fluid, to such fluid pressure actuated force transmitting cylinder 20. In addition, according to the presently most preferred embodiment of the invention, such fluid connection means 26 formed through such first elongated portion 12 of the elongated housing member 20 adjacent such first end cap means 16 will be a threaded type connection.

Such elongated housing member 20 must further include a second end cap means 28. Such second end cap means 28 is engaged with such second elongated portion 14 of the elongated housing member 20 adjacent a first end 30 thereof in order to partially close an axially opposed second end of such elongated housing member 20.

As was previously described in connection with the first end cap member 16, it is presently preferred that such second end cap means 28 is removably secured to such first end 30 of the second elongated portion 14 of such elongated housing member 20. Further, according to this invention, it is most preferred that such second end cap means 28 will be threadedly engaged with such first end 30 of this second elongated portion 14 of the elongated housing member 20. There is an aperture 32, having a predetermined diameter, formed substantially through a center portion of such second end cap means 28.

A securing means, generally designated 40, is engageable with an axially opposed second end 34 of such first elongated portion 12 and an axially opposed second end 36 of such second elongated portion 14. Securing means 40 secures this first elongated portion 12 to the second elongated portion 14 and thereby form such elongated housing member 20.

In the presently preferred embodiment of the fluid pressure actuated force transmitting cylinder 10, such securing means 40 engageable with the axially opposed second end 34 of such first elongated portion 12 and the axially opposed second end 36 of such second elongated portion 14 for securing the first elongated portion 12 to such second elongated portion 14 and thereby form such elongated housing member 20 is a threaded portion 38 formed on such second end 34 of the first elongated portion 12 of such elongated housing member 20 which is threadedly engaged with a threaded portion 42 formed on such second end 34 of the second elongated portion 14 of elongated housing member 20.

Although it has not been specifically illustrated in the attached drawing, it is also in the scope of the present invention to have the outer surface of the first elongated portion 12, adjacent the second end 34 thereof, and the outer surface of the second elongated portion 14, of such elongated housing member 20, adjacent the second end 36 thereof, threaded and connected together with a coupling member.

The fluid pressure actuated force transmitting cylinder 10 has a clutch means, generally designated 50, disposed within such elongated housing member 20 intermediate the first end 18 of such first elongated portion 12 and the second end 36 of such second elongated portion 14. The clutch means 50 provides a first clutch surface 39.

A piston-like member 43 is disposed for reciprocal movement within the first elongated portion 12 of such elongated housing member 20 adjacent such first end 18 of such first elongated portion 12. In the presently preferred embodiment of the invention, as can best be seen in FIG. 2, such piston-like member 43 is provided with a recessed portion 44 adjacent such second surface 45 of such piston-like member 43.

There is a sealing means, generally designated 60, disposed around a peripheral portion 46 of such piston-like member 43 for providing a fluid tight chamber 48 between an inner surface 52 of such first end cap means 16, a first surface 54 of the piston-like member 43 disposed facing such inner surface 52 of the first end cap means 16 and a portion of an inner surface 56 of such first elongated portion 12 of the elongated housing member 20 to receive such predetermined fluid being communicated to the force transmitting cylinder 10 therein. The communication of such fluid pressure to chamber 48 will cause a linear displacement of such piston-like member 43.

In a presently preferred embodiment of such fluid pressure actuated force transmitting cylinder 10, such sealing means 60 disposed around the peripheral portion 46 of such piston-like member 43 includes at least one O-ring 58. In the most presently preferred embodiment, such sealing means 60 disposed around the peripheral portion 46 of this piston-like member 43 will include a pair of O-rings 58 and 62.

An elongated rod-like member 64 is connected at a first end 66 thereof to a radially opposed second surface 45 of such piston-like member 43. This elongated rod-like member 64 extends outwardly through such aperture 32 formed substantially through the center portion of such second end cap means 28 for a first predetermined distance adjacent an axially opposed second end 68 thereof. The elongated rod-like member 64 includes a threaded portion 70. Such threaded portion 70 of this elongated rod-like member 64 extends for a second predetermined distance from a predetermined starting point located adjacent the first end 66 thereof.

A threaded nut member 72 is threadedly engaged with such threaded portion 70 of such elongated rod-like member 64. In the presently preferred embodiment of such fluid pressure actuated force transmitting cylinder 10, the threads formed on such threaded portion 70 of the elongated rod-like member 64 and such threaded nut member 72 will be fast threads. A second clutch surface 74 is disposed on such threaded nut member 72 in a position which enables frictional engagement of such second clutch surface 74 with the first clutch surface 39 disposed on such clutch means 50.

There is an elongated trigger mechanism 76 disposed around a portion of such elongated rod-like member 64. A first end 78 of such elongated trigger mechanism 76 is disposed adjacent the threaded nut member 72 and a second end 80 of such elongated trigger mechanism 76 extends outwardly from such aperture 32 formed substantially through the center portion of the second end cap means 28 for a third predetermined distance. In the presently preferred embodiment of the invention, such elongated trigger mechanism 76 will be a generally cylindrical shaped sleeve-like member. A disc-like member 82 is disposed around and secured to an outer surface 84 of such elongated trigger mechanism 76. Such disc-like member 82 is located a fourth predetermined distance from such first end 78 of the elongated trigger mechanism 76.

A first race assembly 86 has a first surface 88 thereof abuttingly engaged with a first substantially flat surface 89 formed on such threaded nut member 72.

There is a second race assembly 90 which includes a first surface 92 thereof abuttingly engaged with a second substantially flat surface 94 formed on the threaded nut member 72 and a second radially opposed surface 96 which is abuttingly engaged with a first substantially flat surface 98 on such disc-like member 82. Such first race assembly 86 and such second race assembly 90 permitting free rotation of the threaded nut member 72 on such threaded portion 70 of the elongated rod-like member 64, as necessary, to extend the elongated rod-like member 64 from such second end cap means 28 when the first clutch surface 39 disposed on such clutch means 50 is disengaged from the second clutch surface 74 disposed on such threaded nut member 72.

In the presently preferred embodiment of such fluid pressure actuated force transmitting cylinder 20, a first urging means 100 is caged between a second radially opposed surface 102 of such first race assembly 86 and a second radially opposed surface 45 of such piston-like member 43 for urging, in combination with such fluid pressure being communicated to such force transmitting cylinder 10. The second clutch surface 74 carried by the threaded nut member 72 away from such first clutch surface 39 carried by the clutch means 50.

The final essential component of such fluid pressure actuated cylinder 10, according to the invention, is a second urging means 104. Such second urging means 104 is caged between a second radially opposed surface 106 of such second race assembly 90 and an inner surface portion 108 of such second end cap means 28 for overcoming such first urging means 100 and urging such second clutch surface 74 carried by the threaded nut member 72 into engagement with such first clutch surface 39 carried by the clutch means 50 when such fluid pressure is absent in the force transmitting cylinder 10.

In the presently most preferred embodiment of such fluid pressure actuated force transmitting cylinder 10, such first urging means 100 caged between the second radially opposed surface 102 of such first race assembly 86 and the second radially opposed surface 45 of such piston-like member 43 is a spring. Additionally, such second urging means 104 caged between a second radially opposed surface 106 of such second race assembly 90 and an inner surface portion 108 of such second end cap means 28 is a spring.

A predetermined load rating of such second spring is greater than a predetermined load rating of the first spring. Further, the predetermined free height of such first spring is greater than a predetermined free height of such second spring.

While a presently preferred and a number of alternative embodiments of the present invention have been described in detail above, it should be understood that various additional adaptations and/or modifications to such invention can be made, particularly, by those persons who are skilled in the railway vehicle type braking systems art without departing from either the spirit of the instant invention or the scope of the appended claims.

I claim:

1. A fluid pressure actuated force transmitting cylinder, said force transmitting cylinder comprising:
  (a) an elongated housing member, said elongated housing member including;
   (i) a first elongated portion having a first predetermined length,
   (ii) a second elongated portion having a second predetermined length
   (iii) a first end cap means engaged with said first elongated portion of said elongated housing member adjacent a first end thereof for closing said first end of said elongated housing member in a substantially fluid tight manner,
   (iv) a fluid connection means formed through said first elongated portion of said elongated housing member adjacent said first end cap means for enabling communication of a predetermined fluid to said fluid pressure actuated force transmitting cylinder;
   (v) a second end cap means engaged with said second elongated portion of said elongated housing member adjacent a first end thereof for partially closing an axially opposed second end of said elongated housing member,
   (vi) an aperture formed substantially through a center of said second end cap means, and (vii) a means engageable with an axially opposed second end of said first elongated portion and an axially opposed second end of said second elongated portion for securing said first elongated portion to said second elongated portion thereby forming said elongated housing member;

(b) a clutch means disposed within said elongated housing member intermediate said first end of said first elongated portion and said second end of said second elongated portion for providing a first clutch surface;

(c) a piston-like member disposed for reciprocal movement within said elongated housing member adjacent said first end of said first elongated portion;

(d) a sealing means disposed around a peripheral portion of said piston-like member for providing a fluid tight chamber between an inner surface of said first end cap means, a first surface of said piston-like member disposed facing said inner surface of said first end cap means and a portion of an inner surface of said first elongated portion of said elongated housing member to receive such predetermined fluid being communicated to said force transmitting cylinder therein and cause a linear displacement of said piston-like member;

(e) an elongated rod-like member connected at a first end thereof to a radially opposed second surface of said piston-like member and extending through said aperture formed substantially through a center of said second end cap means for a first predetermined distance adjacent an axially opposed second end thereof, said elongated rod-like member having a threaded portion extending for a second predetermined distance from a predetermined starting point adjacent said first end thereof;

(f) a threaded nut member threadedly engaged with said threaded portion of said elongated rod-like member;

(g) a second clutch surface disposed on said threaded nut member in a position which enables frictional engagement with said first clutch surface disposed on said clutch means;

(h) an elongated trigger mechanism disposed around a portion of said elongated rod-like member, a first end of said elongated trigger mechanism being disposed adjacent said threaded nut member and a second end of said elongated trigger mechanism extending out of said aperture formed substantially through a center of said second end cap means for a third predetermined distance;

(i) a disc-like member disposed around and secured to an outer surface of said trigger mechanism a fourth predetermined distance from said first end thereof;

(j) a first race assembly having a first surface thereof abuttingly engaged with a first substantially flat surface formed on said threaded nut member;

(k) a second race assembly having a first surface thereof abuttingly engaged with a second substantially flat surface formed on said threaded nut member and a second radially opposed surface abuttingly engaged with a first substantially flat surface on said disc-like member, said first race assembly and said second race assembly permitting free rotation of said threaded nut member on said threaded portion of said rod-like member as necessary to extend said rod-like member from said second end cap means when said first clutch surface disposed on said clutch means is disengaged from said second clutch surface disposed on said threaded nut member;

(l) a first urging means caged between a second radially opposed surface of said first race assembly and a second radially opposed surface of said piston-like member for urging, in combination with such fluid pressure being communicated to said force transmitting cylinder, said second clutch surface carried by said threaded nut member away from said first clutch surface carried by said clutch means; and (m) a second urging means caged between a second radially opposed surface of said second race assembly and an inner surface of said second end cap means for overcoming said first urging means and urging said second clutch surface carried by said threaded nut member into engagement with said first clutch surface carried by said clutch means when such fluid pressure is absent in said force transmitting cylinder.

2. A fluid pressure actuated force transmitting cylinder, according to claim 1, wherein said first end cap means is removably secured to said first end of said first elongated portion of said elongated housing member.

3. A fluid pressure actuated force transmitting cylinder, according to claim 2, wherein said first end cap means is threadedly engaged with said first end of said first elongated portion of said elongated housing member.

4. A fluid pressure actuated force transmitting cylinder, according to claim 1, wherein said second end cap means is removably secured to said first end of said second elongated portion of said elongated housing member.

5. A fluid pressure actuated force transmitting cylinder, according to claim 4, wherein said second end cap means is threadedly engaged with said first end of said second elongated portion of said elongated housing member.

6. A fluid pressure actuated force transmitting cylinder, according to claim 1, wherein said means engageable with said axially opposed second end of said first elongated portion and said axially opposed second end of said second elongated portion for securing said first elongated portion to said second elongated portion thereby forming said elongated housing member is a threaded portion formed on said second end of said first elongated portion of said elongated housing member threadedly engaged with a threaded portion formed on said second end of said second elongated portion of said elongated housing member.

7. A fluid pressure actuated force transmitting cylinder, according to claim 1, wherein threads formed on said threaded portion of said rod-like member and said threaded nut member are fast threads.

8. A fluid pressure actuated force transmitting cylinder, according to claim 1, wherein said sealing means disposed around said peripheral portion of said piston-like member includes at least one O-ring.

9. A fluid pressure actuated force transmitting cylinder, according to claim 8, wherein said sealing means disposed around said peripheral portion of said piston-like member includes a pair of O-rings.

10. A fluid pressure actuated force transmitting cylinder, according to claim 1, wherein said first urging means caged between said second radially opposed surface of said first race assembly and said second radially opposed surface of said piston-like member is a spring having a first predetermined load rating and a first predetermined free height.

11. A fluid pressure actuated force transmitting cylinder, according to claim 10, wherein said second urging means caged between a second radially opposed surface of said second race assembly and an inner surface of said second end cap means is a spring having a second predetermined load rating and a second predetermined free height.

12. A fluid pressure actuated force transmitting cylinder, according to claim 11, wherein said second predetermined load rating of said second spring is greater than said first predetermined load rating of said first spring.

13. A fluid pressure actuated force transmitting cylinder, according to claim 12, wherein said first predetermined free height of said first spring is greater than said second predetermined free height of said second spring.

14. A fluid pressure actuated force transmitting cylinder, according to claim 1, wherein said fluid pressure actuated force transmitting cylinder is actuated by one of pneumatic pressure and hydraulic pressure.

15. A fluid pressure actuated force transmitting cylinder, according to claim 14, wherein said fluid pressure actuated force transmitting cylinder is actuated by hydraulic pressure.

16. A fluid pressure actuated force transmitting cylinder, according to claim 1, wherein said a fluid connection means formed through said first elongated portion of said elongated housing member adjacent said first end cap means is a threaded connection.

17. A fluid pressure actuated force transmitting cylinder, according to claim 1, wherein said first end cap means includes an annular groove formed adjacent said inner surface thereof for receiving fluid pressure therein, said annular groove having each of a predetermined width and a predetermined depth.

18. A fluid pressure actuated force transmitting cylinder, according to claim 1, wherein said first end cap means includes a recess portion formed in said inner surface thereof.

19. A fluid pressure actuated force transmitting cylinder, according to claim 1, wherein said first elongated portion and said second elongated portion of said elongated housing member are generally cylindrical tube-like members.

20. A fluid pressure actuated force transmitting cylinder, according to claim 1, wherein said elongated trigger mechanism is a sleeve-like member.

* * * * *